United States Patent

Matsumoto et al.

(10) Patent No.: US 9,063,233 B2
(45) Date of Patent: Jun. 23, 2015

(54) EXPOSURE MANAGEMENT SYSTEM, DOSIMETER, AND WIRELESS RELAY DEVICE

(75) Inventors: Eiji Matsumoto, Hino (JP); Tetsuo Shibata, Kokubunji (JP); Minoru Imai, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 1177 days.

(21) Appl. No.: 12/735,878

(22) PCT Filed: Jan. 29, 2009

(86) PCT No.: PCT/JP2009/051451
§ 371 (c)(1),
(2), (4) Date: Nov. 17, 2010

(87) PCT Pub. No.: WO2009/107444
PCT Pub. Date: Sep. 3, 2009

(65) Prior Publication Data
US 2011/0063127 A1    Mar. 17, 2011

(30) Foreign Application Priority Data

Feb. 26, 2008  (JP) ................. 2008-044682

(51) Int. Cl.
*G08B 1/08* (2006.01)
*G05B 23/02* (2006.01)
(Continued)

(52) U.S. Cl.
CPC . *G01T 7/00* (2013.01); *H04B 7/155* (2013.01); *H04B 7/2606* (2013.01); *H04W 74/08* (2013.01); *H04W 84/047* (2013.01)

(58) Field of Classification Search
CPC ................. G08B 23/00; G05B 23/02
USPC ....................................... 340/573.1
See application file for complete search history.

(56) References Cited

U.S. PATENT DOCUMENTS 6,889,165 B2 * 5/2005 Lind et al. .................. 702/183
7,034,677 B2 * 4/2006 Steinthal et al. ......... 340/539.12
(Continued)

FOREIGN PATENT DOCUMENTS

| JP | 08-334563 A | 12/1996 |
|---|---|---|
| JP | 11-248839 A | 9/1999 |

(Continued)

*Primary Examiner* — Jennifer Mehmood
*Assistant Examiner* — Pameshanand Mahase
(74) *Attorney, Agent, or Firm* — Rabin & Berdo, P.C.

(57) ABSTRACT

An exposure management system includes dosimeters, wireless relay devices that wirelessly communicate with the dosimeters, and a monitoring device. The dosimeters are carried by workers for measuring exposure doses in a radiation management facility. The wireless relay devices transmit a monitor indication message that requests the dosimeters to provide respective responses that include information of measured exposure doses. The wireless relay devices receive the responses from the dosimeters by using allocated respective communication channels that are different from each other. Each dosimeter receives the monitoring indication message and generates a designated number of response times for providing a response to the monitor indication message, and determines a communication channel corresponding to each of the generated response times. The monitoring device is connected to the wireless relay devices for monitoring an exposure state of each of the workers through the wireless relay devices and dosimeters.

12 Claims, 6 Drawing Sheets

(51) Int. Cl.
*G03B 11/00* (2006.01)
*H04B 7/185* (2006.01)
*H04W 72/00* (2009.01)
*H04B 7/00* (2006.01)
*G01T 7/00* (2006.01)
*H04B 7/155* (2006.01)
*H04B 7/26* (2006.01)
*H04W 74/08* (2009.01)
*H04W 84/04* (2009.01)

(56) References Cited

U.S. PATENT DOCUMENTS

| | | | |
|---|---|---|---|
| 2002/0180606 A1* | 12/2002 | Kitaguchi et al. | 340/573.1 |
| 2002/0195572 A1 | 12/2002 | Kitaguchi et al. | |
| 2006/0125623 A1* | 6/2006 | Appelt et al. | 340/521 |
| 2006/0168235 A1* | 7/2006 | Sekiguchi et al. | 709/227 |
| 2007/0210916 A1* | 9/2007 | Ogushi et al. | 340/531 |
| 2007/0258395 A1* | 11/2007 | Jollota et al. | 370/310 |
| 2009/0002129 A1* | 1/2009 | Shin | 340/10.1 |
| 2011/0064173 A1* | 3/2011 | Ojard | 375/346 |

FOREIGN PATENT DOCUMENTS

| | | |
|---|---|---|
| JP | 2002-288774 A | 10/2002 |
| JP | 2002-365366 A | 12/2002 |
| JP | 2003-014847 A | 1/2003 |
| JP | 2003-130956 A | 5/2003 |
| JP | 2004-012197 A | 1/2004 |
| JP | 2004-132825 A | 4/2004 |
| JP | 2004-236067 A | 8/2004 |
| JP | 2005-026816 A | 1/2005 |
| JP | 2005-073118 A | 3/2005 |
| JP | 2005-094385 A | 4/2005 |
| JP | 2005-233806 A | 9/2005 |
| JP | 2006-058220 A | 3/2006 |
| JP | 2006-086563 A | 3/2006 |
| JP | 2007-151025 A | 6/2007 |

* cited by examiner

FIG. 9

EXPOSURE MANAGEMENT SYSTEM, DOSIMETER, AND WIRELESS RELAY DEVICE

CROSS REFERENCE TO RELATED APPLICATIONS

This application is the national phase of international application number PCT/JP2009/051451, filed Jan. 29, 2009, and claims the benefit of priority of Japanese application 2008-044682, filed Feb. 26, 2008

BACKGROUND OF THE INVENTION

The present invention relates to an exposure management system that performs management of exposure state of workers working in a radiation management region in a nuclear power plant, a nuclear fuel processing facility, or the like, and also to a dosimeter, and a wireless relay device.

A system in which a monitoring device communicates via a base station with a portable dosimeter having a telephone function such as a cellular phone or a PHS™, thereby collecting exposure dose data, is disclosed, for example in Japanese Patent Application Publication No. H11-248839 (referred to hereinbelow as "Document 1"), Japanese Patent Application Publication No. 2002-365366 (referred to hereinbelow as "Document 2"), and Japanese Patent Application Publication No. 2003-130956 (referred to hereinbelow as "Document 3"), as a radiation exposure management system for measuring the radiation dose in a radiation management region in a nuclear power plant or a nuclear fuel processing facility and conducting management in order to protect the workers from danger. Further, in a system described in Japanese Patent Application Publication No. 2004-12197 (referred to hereinbelow as "Document 4") a primary station and a secondary station communicate by a specified low power radio station. The primary station and a monitoring device communicate by Ethernet™ via a wireless LAN. Exposure dose data are sent by wireless communication from the secondary station to the primary station, image data are sent by wired communication from a camera to the primary station, and the image and the exposure dose data are monitored at the same time. Further, Japanese Patent Application Publication No. 2003-14847 (referred to hereinbelow as "Document 5") describes a system that uses wireless communication to collect exposure dose data and maps the exposure state.

In the case of a portable dosimeter that combines a cellular phone or PHS™ with a dosimeter, as described in Documents 1, 2, and 3, circuit connection is performed by dialing each time the monitoring device and the portable dosimeter communicate with each other. Therefore, it takes long time to be connected to the public line. As a result, such a system is not suitable for collecting information such as an exposure dose from all of the dosimeters in the facility quickly. Further, Documents 4 and 5 do not describe a feature of collecting a large number of dosimeter data quickly.

The present invention has been created to resolve the above-described problems intrinsic to conventional technology and provides an exposure management system, a dosimeter, and a wireless relay device that make it possible to collect exposure dose data from a large number of dosimeters quickly.

SUMMARY OF THE INVENTION

The present invention provides an exposure management system including: a plurality of dosimeters which are carried by workers and measure an exposure dose in a radiation management facility; a plurality of wireless relay devices that wirelessly communicate with the plurality of dosimeters; and a monitoring device which is connected to the wireless relay devices and monitors an exposure state of the workers, wherein a different communication channel is allocated to each of the plurality of wireless relay devices, each of the plurality of wireless relay devices is provided with monitor indication transmission means for transmitting by using the allocated communication channel a monitor indication message for requesting the dosimeter to notify of the exposure dose, the dosimeter includes: monitor indication reception means for receiving the monitor indication message from at least one of the plurality of wireless relay devices; response time determination means for generating a plurality of response times for which a reception end time of the monitor indication message received, by the monitor indication reception means is taken as a starting point and determining a correspondence relationship between each of the plurality of generated response times and the communication channels; and response means for transmitting a response for notifying of the exposure dose, at each response time determined by the response time determination means, to a communication channel corresponding to the each response time, and the response can be retransmitted even when a collision of the responses transmitted from the plurality of dosimeters is occurred.

With such a configuration, the dosimeters transmit responses to communication channels at a plurality of response times. Therefore, a response can be transmitted again to another channel at another response time even when a collision occurs, and exposure dose data can be collected from a large number of dosimeters quickly.

In the preferred embodiment, the wireless relay device further includes acknowledgment transmission means for transmitting an acknowledgment signal, upon reception of a response from the dosimeter, for notifying of normal reception of the response, and the dosimeter further includes response stop means for stopping the transmission of subsequent responses when the acknowledgment signal is received from the wireless relay device.

With such a configuration, the dosimeter can stop subsequent transmission of the responses when the acknowledgment signal has been received from the wireless relay device. Therefore, we reduce unnecessary transmission, and avoid collisions, and collect exposure dose data efficiently.

In another preferred embodiment, the wireless relay device further comprises response time number designation means that can change the number of response times generated by the dosimeters by including information designating the number of the response times in the monitor indication message transmitted to the dosimeters when the number of the response times is designated.

With such a configuration, the number of response times generated by the dosimeters can be easily changed by designating the number of response times.

In another preferred embodiment, the wireless relay devices and the monitor device are wirelessly connected.

In another preferred embodiment, the wireless relay devices and the monitor device are connected by wires.

The present invention also provides a dosimeter which is carried by a worker and measures an exposure dose in a radiation management facility and performs wireless communication by using different communication channels, the dosimeter including: monitor indication reception means for receiving a monitor indication message for requesting a notification of an exposure dose; response time determination means for generating a plurality of response times for which a reception end time of the monitor indication message received by the monitor indication reception means is taken as a starting point and determining a correspondence relationship between each of the plurality of generated response times and communication channels allocated to the plurality of wireless relay devices; response means for transmitting a response for notifying of the exposure dose, at each response time determined by the response time determination means, to a communication channel corresponding to the each response time, and response stop means for stopping the transmission of subsequent responses when an acknowledgment signal that notifies of normal reception of the response transmitted by the response means is received.

With such a configuration, the dosimeter transmits a response to communication channels at a plurality of response times. Therefore, a response can be transmitted again to another channel at another response time even when a collision occurs, and exposure dose data can be collected quickly. Further, the dosimeter can stop the transmission of subsequent responses when the acknowledgment signal has been received from the wireless relay device. Therefore, we reduce unnecessary transmission, and avoid collisions, and collect exposure dose data efficiently.

The present invention also relates to a wireless relay device that wirelessly communicates with a dosimeter, which is carried by a worker and measures an exposure dose in a radiation management facility, the wireless relay device including: monitor indication transmission means for transmitting, by a communication channel uniquely allocated to the wireless relay device itself, a monitor indication message for designating the number of transmission of responses by the dosimeter and requesting from the dosimeter the response including exposure dose data, and acknowledgment transmission means for transmitting to the dosimeter an acknowledgment signal for stopping the transmission of subsequent responses when the response to the monitor indication message transmitted by the monitor indication transmission means is received from the dosimeter.

With such a configuration, the wireless relay device designates the number of transmission of responses by the dosimeter in the monitor indication message and sends an acknowledgment signal for stopping the transmission of subsequent responses when the response to the monitor indication message has been normally received. Therefore, when a collision or the like has occurred and the wireless relay device could not receive the response normally, the responses can be transmitted to the dosimeters up to the designated number of transmission, and when the response has been received, subsequent responses to the dosimeters can be stopped, the communication volume can be reduced, the occurrence of collisions can be prevented, and exposure dose data can be collected efficiently quickly.

In accordance with the present invention, the dosimeters transmit responses to communication channels at a plurality of response times. Therefore, a response can be transmitted again to another channel at another response time even when a collision occurs, and exposure dose data can be collected from a large number of dosimeters quickly.

DESCRIPTION OF THE PREFERRED EMBODIMENT

An embodiment of the present invention will be described below with reference to the appended drawings. In the drawings referred to in the explanation below, like components will be assigned with like reference numerals.

(Configuration of Exposure Management System)

Figure 1:
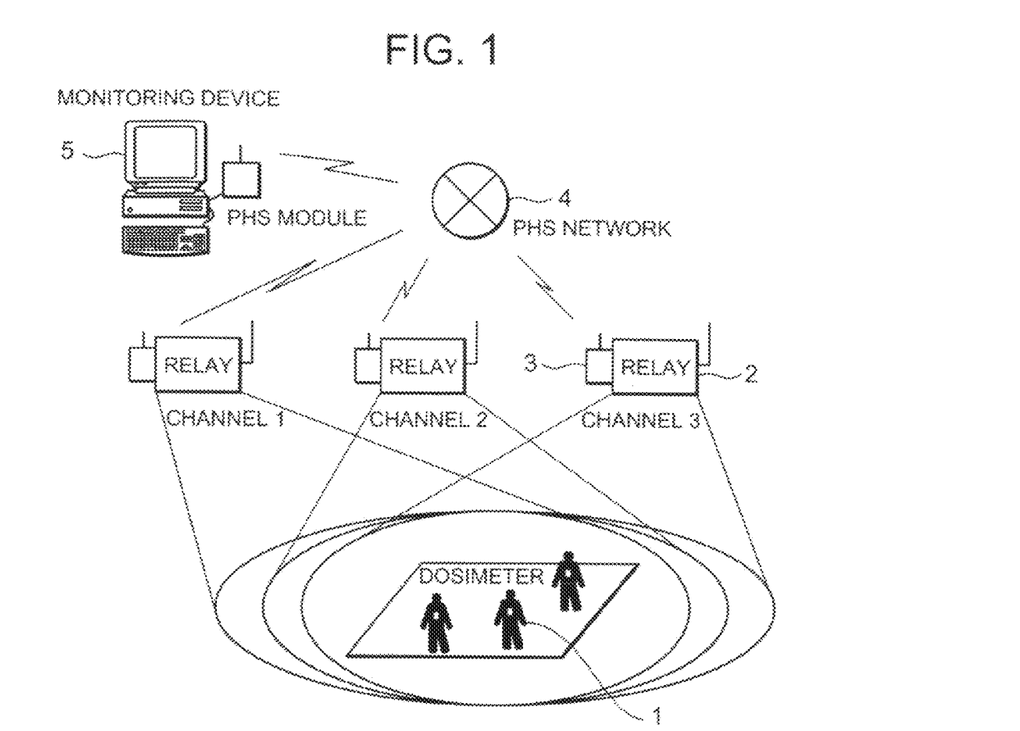
FIG. 1 illustrates the configuration of an exposure management system according to an embodiment of the present invention.

FIG. 1 illustrates the configuration of an exposure management system according to an embodiment of the present invention. As shown in the figure, the exposure management system is constituted by a plurality of dosimeters 1 having a wireless communication function, a plurality of wireless relay devices 2 that perform wireless communication with the dosimeters 1, communication units 3 connected to the wireless relay devices 2, a monitoring device 5 that collects via the wireless relay devices 2 exposure dose data measured by the dosimeters 1 and monitors the exposure of workers, and a network 4 such as a PHS (Personal Handyphone System™) network communicably connected between the communication units 3 and the monitoring device 5. The network 4 may be constituted by wireless connection with the PHS™ network as shown in FIG. 1 or by wire connection with Ethernet™ or the like.

Wireless communication performed between the dosimeters 1 and the wireless relay devices 2 is based, for example, on a FDMA (Frequency Division Multiple Access) system. The FDMA is a communication system in which the entire frequency band is divided into several bands, individual channels are allocated to divided bands, and communication can be simultaneously performed in all of the channels. In the present embodiment, different intrinsic channels, e.g., channels 1, 2 and 3 in FIG. 1, are allocated to the wireless relay devices 2, and the dosimeters 1 can communicate via all of the channels. Further, the dosimeters are driven by batteries, but operated intermittently for communication to ensure long-term operation.

(Configuration of Dosimeter)

Figure 2:
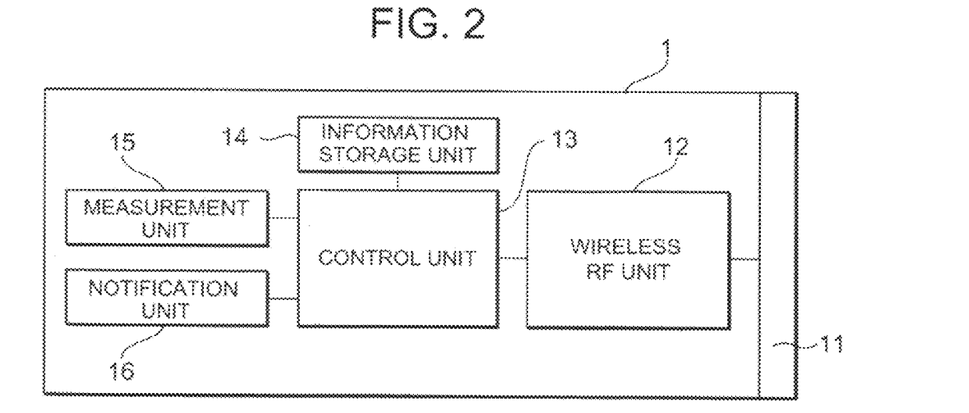
FIG. 2 illustrates the configuration of a dosimeter according to the embodiment.

FIG. 2 shows the configuration of the dosimeter 1. As shown in the figure, the dosimeter 1 is constituted by an antenna 11 for communicating with the wireless relay devices 2, an RF (Radio Frequency) unit 12 including an RFID (Radio Frequency Identification) tag for performing wireless communication, a control unit 13 that includes a CPU (Central Processing Unit) and controls the operation of the dosimeter 1, an information storage unit 14 that stores the measured radiation dose (exposure dose), the number of response start times (referred to hereinbelow as "the number of response time slots") received from the wireless relay devices 2, and a response time slot table that holds response times determined for communication channels, a measurement unit 15 that measures the radiation dose, and a notification unit 16 for notifying of an abnormality when abnormality information is present from the monitoring device 5 to the dosimeter 1. The notification with the notification unit 16 can be performed by sound such as buzzer sound, or by visual information such as light emission by a LED (Light Emitting Diode).

Figure 3:
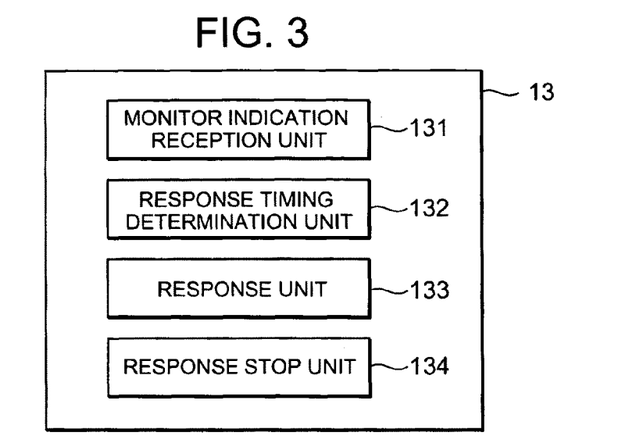
FIG. 3 illustrates the configuration of a control unit of the dosimeter according to the embodiment.

As shown in FIG. 3, the control unit 13 includes a monitor indication reception unit 131, a response time determination unit 132, a response unit 133, and a response stop unit 134. Functions of these units are realized by executing a program with the CPU of the control unit 13.

The monitor indication reception unit 131 receives a monitor indication message transmitted from one or a plurality of wireless relay devices 2 via an intrinsic communication channel.

The response time determination unit 132 generates a plurality of response times for which a reception end time of the monitor indication message received by the monitor indication reception unit 131 is a starting point. The correspondence relationship between the plurality of generated response times and communication channels correspondingly allocated to the plurality of wireless relay devices 2 is determined at random by using random numbers, thereby determining a time at which a response should be transmitted in each communication channel. In the present embodiment, the response time determination unit determines the number of the plurality of response times that has to be generated on the basis of information designated in the received monitor indication message.

The response unit 133 transmits a monitor response electronic test for notifying of the exposure dose measured by the measurement unit 133 in the communication channel corresponding to each response time at the response times determined by the response time determination unit 132.

When the response stop unit 134 receives an ACK (ACKnowledgment signal) from the wireless relay device 2 after the monitor response message has been transmitted, it means that the monitor response message has normally arrived to the wireless relay device 2, without the collision or the like. Therefore, the response stop unit stops the transmission of subsequent monitor response messages to the wireless relay device 2.

(Configuration of the Wireless relay device)

Figure 4:
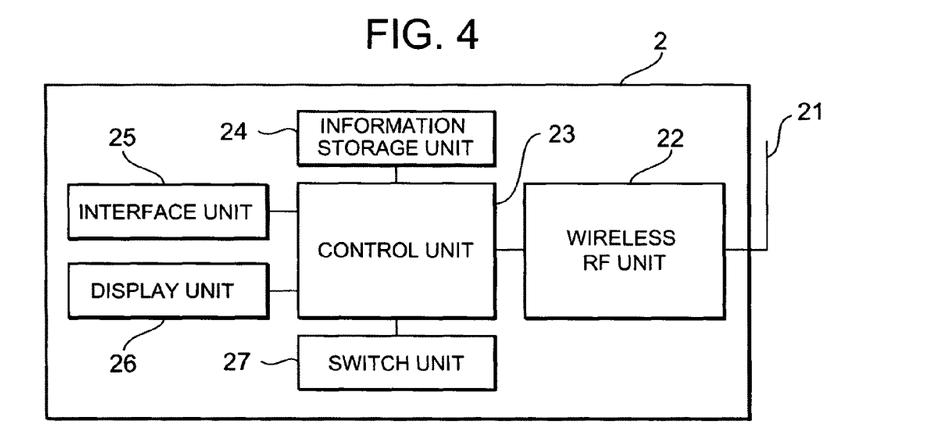
FIG. 4 illustrates the configuration of a wireless relay device according to the embodiment.

FIG. 4 shows the configuration of the wireless relay device 2. As shown in the figure, the wireless relay device 2 includes an antenna 21 for communicating with the dosimeters 1, a RF (Radio Frequency) unit 22 including a RFID receiver, a control unit 23 that includes a CPU and controls the operation of the wireless relay device 2, an information storage unit 24 for holding the monitor response message received from the dosimeters 1, an interface unit 25 for communicating with the communication device 3, a display device 26 for displaying the operation state, and a switch unit 27 including a switch for setting a channel that will be inherently allocated to the wireless relay device 2, a response time slot number, and whether the host device 2 is a wireless relay device transmitting the monitor indication message to the dosimeters 1.

Figure 5:
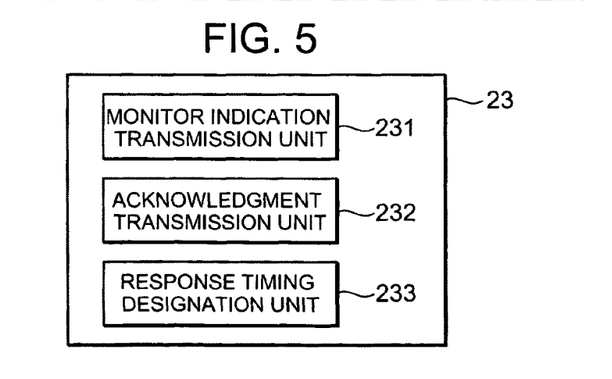
FIG. 5 illustrates the configuration of a control unit of a wireless relay device according to the embodiment.

As shown in FIG. 5, the control unit 23 includes a monitor indication transmission unit 231, an acknowledgment transmission unit 232, and a response time designation unit 233. The functions of these units are realized by executing a program with the CPU of the control unit 23.

The monitor indication transmission unit 231 transmits a monitor indication message via a communication channel intrinsically allocated.

The acknowledgment transmission unit 232 returns to the dosimeter 1 the ACK (ACKnowledgment signal) for notifying of normal reception of the monitor response message, when a monitor response message has been received from the dosimeter 1, as a response to the monitor indication message transmitted by the monitor indication transmission unit 231.

When the number of response times has been designated by setting to the switch unit 27 or the information storage unit 24, the response time designation unit 233 includes information displaying the designated number of response times into the monitor indication message when the monitor indication message is generated. As a result, the number of response times generated by the dosimeter 1 can be changed.

Figure 6A:
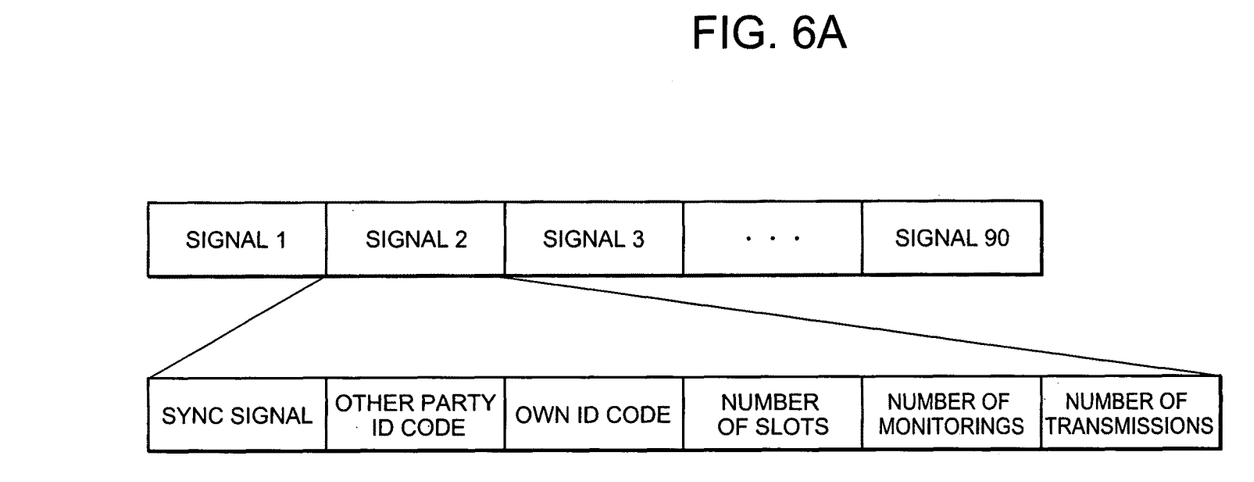
FIG. 6A shows an example of a monitor indication message transmitted from the wireless relay device to the dosimeter according to the embodiment.
Figure 6B:
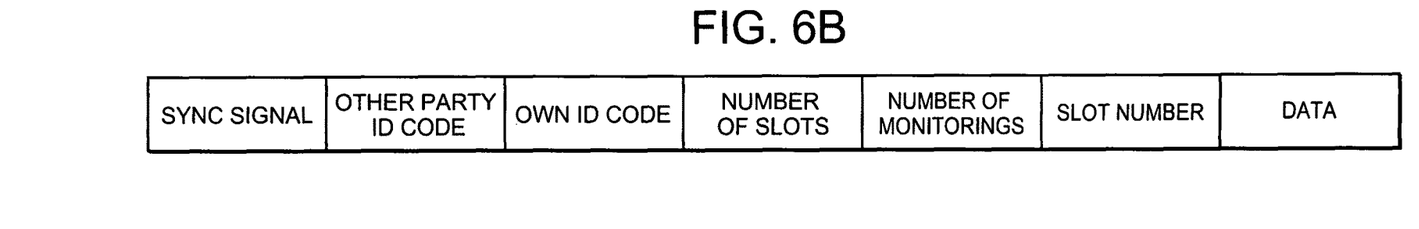
FIG. 6B shows an example of a monitor response message transmitted from the dosimeter to the wireless relay device.

FIGS. 6A and 6B show an example of a monitor indication message and a monitor response message per one slot, respectively. The monitor indication message shown in FIG. 6A is transmitted from the wireless relay device 2 to the dosimeter 1 according to the embodiment. The monitor response message shown in FIG. 6B is transmitted from the dosimeter 1 to the wireless relay device 2.

The monitor indication message shown in FIG. 6A includes "SYNC SIGNAL", "OTHER PARTY ID CODE", "OWN ID CODE", "NUMBER OF SLOTS" representing the number of response time slots, " NUMBER OF MONITORINGS", and "REMAINING NUMBER OF TRANSMISSIONS". Each wireless relay device 2 repeatedly transmits a monitor indication message per one slot that has the same data contents, except the "REMAINING NUMBER OF TRANSMISSIONS" as data items, and the dosimeter 1 may receive any monitor indication message during intermission start. The dosimeter 1 uses the "NUMBER OF SLOTS" as the number of response time slots when calculating the response time for each channel and uses the "NUMBER OF MONITORINGS" for calculating the operation stop time after the ACK has been received. The extent to which the monitor indication messages are continued is understood from the "REMAINING NUMBER OF TRANSMISSIONS". As a result, the reception end time of the monitor indication message, that is, the start point of the response time slot, can be found.

The monitor response message shown in FIG. 6B has "SYNC SIGNAL", "OTHER PARTY ID CODE", "OWN ID CODE", "NUMBER OF SLOTS" representing the number of response time slots, "NUMBER OF MONITORINGS", "SLOT NUMBER" and "DATA" including the measured exposure dose data. The wireless relay device 2 calculates the monitor end time when the monitor collection operation is performed the number of times represented by the "NUMBER OF MONITORINGS" on the basis of the "NUMBER OF SLOTS" and "SLOT NUMBER".

(Operation)

Figure 7:
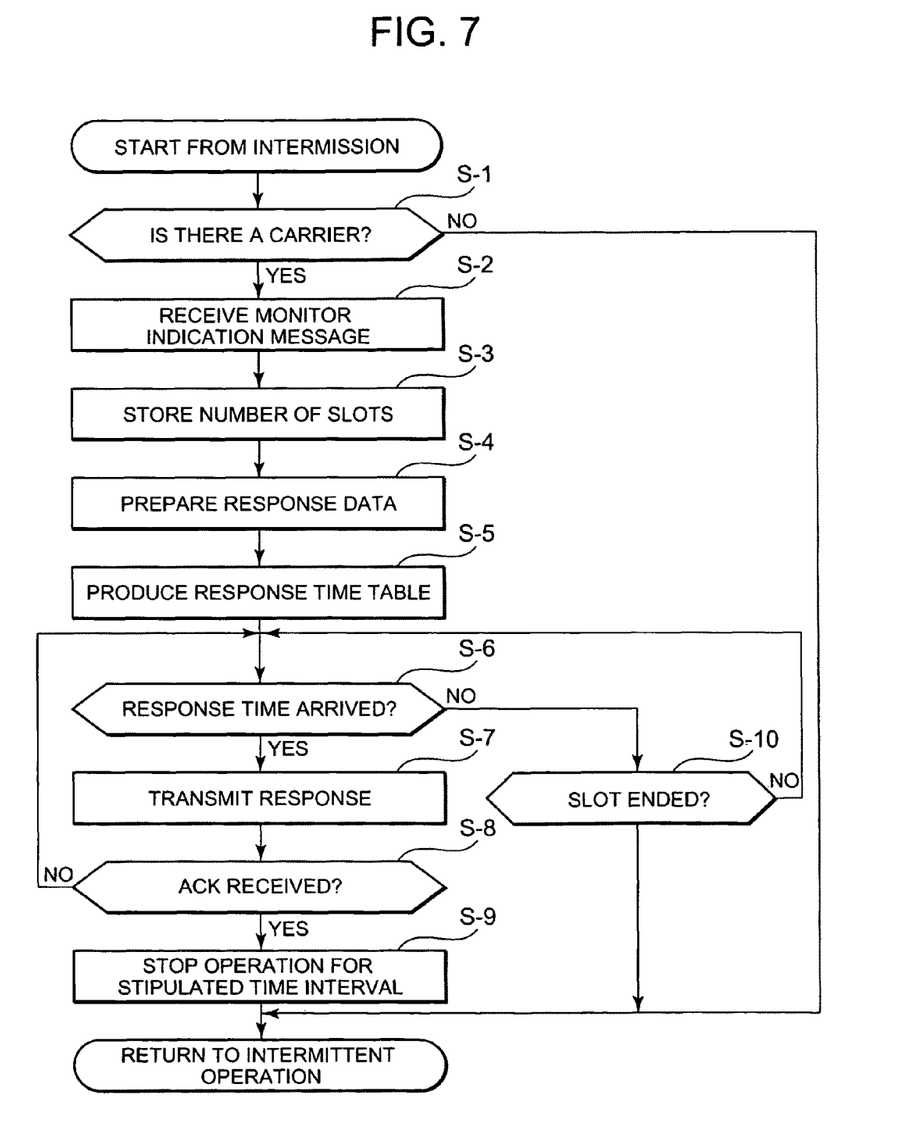
FIG. 7 is a flowchart illustrating the operation of the dosimeter according to the embodiment.
Figure 8:
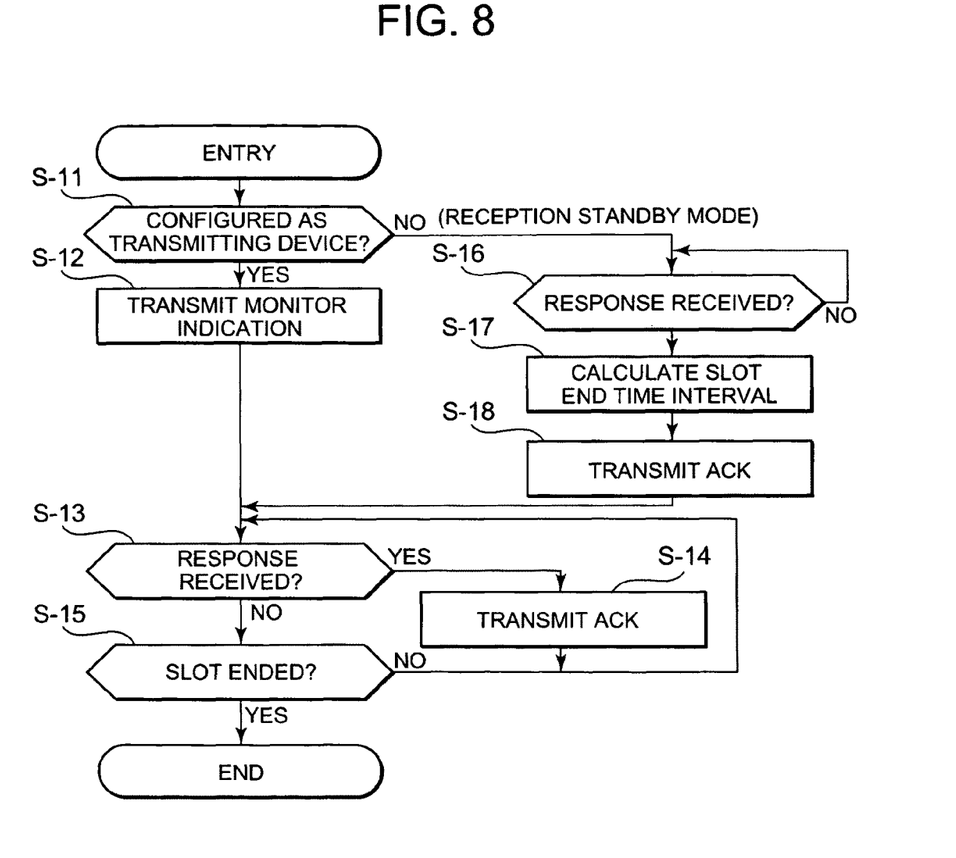
FIG. 8 is a flowchart illustrating the operation of the wireless relay device according to the embodiment.

The operation of the present embodiment will be described below with reference to FIGS. 7 and 8.

First, a monitoring period is determined in advance. The wireless relay devices 2 collect exposure dose data of all of the dosimeters 1 from which the data are wished to be collected in the one period unit. In order to collect the data efficiently from an unspecified large number of dosimeters 1, the time of response start from the dosimeters 1 is divided into slots for each start time interval and a monitor collection operation from the monitor indication message transmission to the monitor response message reception is repeated a plurality of times in one period. The number of times the monitor collection operation is continuously repeated (referred to hereinbelow as "one set") correspondingly to the number of response time slots is determined in balance with the monitoring period. For example, when the number of response time slots is 12, five monitor collection operations are performed to form one set. When the number of response time slots is 20, four monitor collection operations are performed to form one set. When the number of response time slots is 30, three monitor collection operations are performed to form one set. When the number of response time slots is 50, two monitor collection operations are performed to form one set.

(Operation of Dosimeter)

The operation of the dosimeter 1 will be explained below with reference to the flowchart shown in FIG. 7.

When the dosimeter 1 is started in an intermittent operation mode, carrier sensing per one channel used in the exposure monitoring system is performed (S-1).

Where the carrier is present (S-1:Y), the monitor indication reception unit 131 of the dosimeter 1 receives a monitor indication message (S-2). The dosimeter 1 recognizes the number of response time slots from the "NUMBER OF SLOTS" contained in the received monitor indication message and stores the number of response time slots in the information storage unit 14 (S-3).

The dosimeter 1 then prepares the monitor response message including the exposure dose measured by the measurement unit 15 (S-4).

The response time determination unit 132 of the dosimeter 1 then determines the response time slots for transmitting a response for each communication channel on the basis of random numbers, the number of response time slots being recognized in S-3. A response time slot table that holds the correspondence relationship between communication channels and response time slots is then produced and stored in the information storage unit 14 (S-5).

Whether or not the time for response has arrived is then acknowledged, while referring to the response time slot table (S-6), and when the time for response has arrived (S-6:Y), the response unit 132 transmits a monitor response message to the corresponding communication channel (S-7).

Then, the ACK reception standby is performed in the channel that has received the monitor response message (S-8), and when the ACK has been received (S-8: Y), the response stop unit 134 performs no transmission in subsequent response time slots, stops the communication operation for a stipulated time interval (S-9), and then returns to intermittent operation of communication. The stipulated time interval as referred to herein is a time interval till the monitor collection operation is repeated the aforementioned number of times, that is, till one set is completed.

Where the ACK has not been received (S-8: N), the next response time slot is checked (S-6) and the response operation (S-7) is repeated. After the operation has been repeated the number of response time slots designated from the wireless relay device 2 (S-10: Y), the operation returns to intermittent operation.

(Operation of Wireless Relay Device)

The operation of the wireless relay device 2 will be explained below with reference to FIG. 8.

The wireless relay device 2 determines whether the host device 2 is a wireless relay device transmitting a monitor indication message or a wireless relay device that does not transmit the monitor indication message on the basis of switch settings in the switch unit 27 or data stored in the information storage unit 24 (S-11).

When the host device 2 is a wireless relay device 2 transmitting a monitor indication message (S-11: Y), the response time indication unit 233 sets in the "NUMBER OF SLOTS" of the monitor indication message the number of response time slots designated by settings in the switch unit 27 or information storage unit 24, and the monitor indication transmission unit 231 send by radio wave to the dosimeter 1 the monitor indication message including the information on the number of slots designated by the response time designation unit 233 (S-12).

A reception standby mode is then assumed, and the wireless relay device 2 waits for a response from the dosimeter 1 (S-13). When the monitor response message has been received from the dosimeter 1 (S1-13: Y), the acknowledgment transmission unit 232 transmits an ACK to the dosimeter 1 (S-14). Once the reception standby has been performed for a time corresponding to the designated number of response time slots (S-15: Y), one monitor collection operation is completed.

Where the host device 2 is a wireless relay device 2 that does not transmit a monitor indication message (S-11: N), a reception standby mode is assumed. When a monitor response message has been received from the dosimeter 1 (S-16:Y), a time interval in which the reception of the monitor response message is completed for all of the slots is found on the basis of the information on the number of slots contained in the monitor response message (S-17). The acknowledgment transmission unit 232 then transmits an ACK to the dosimeter 1 (S-18). Once the reception standby has been performed for the found time interval in which slot reception is completed (S-15: Y), one monitor collection operation is completed.

The communication between the wireless relay device 2 and the monitoring device 5 may be an operation linked to communication between the wireless relay device 2 and the dosimeter 1 or an independent operation.

The "linked" operation as referred to herein is an operation in which the wireless relay device 2 executes communication with the dosimeter 1 when the wireless relay device receives a monitor indication from the monitoring device 5, and the wireless relay device 2 transfers data to the monitoring device 5 once one set of communication has been completed. Alternatively, the wireless relay device 2 independently issues a monitor indication to the dosimeter 1, without receiving the monitor indication from the monitoring device 5, and the wireless relay device 2 transfers data to the monitoring device 5 once one set of communication has been completed.

The "independent" operation as referred to herein is an operation in which the wireless relay device 2 transfers the monitor response message that has been stored in the information recording unit 24 to the monitoring device 5 upon receiving a monitor request from the monitor device 5, regardless of communication between the wireless relay device 2 and the dosimeter 1.

(Example of Message Exchange)

Figure 9:
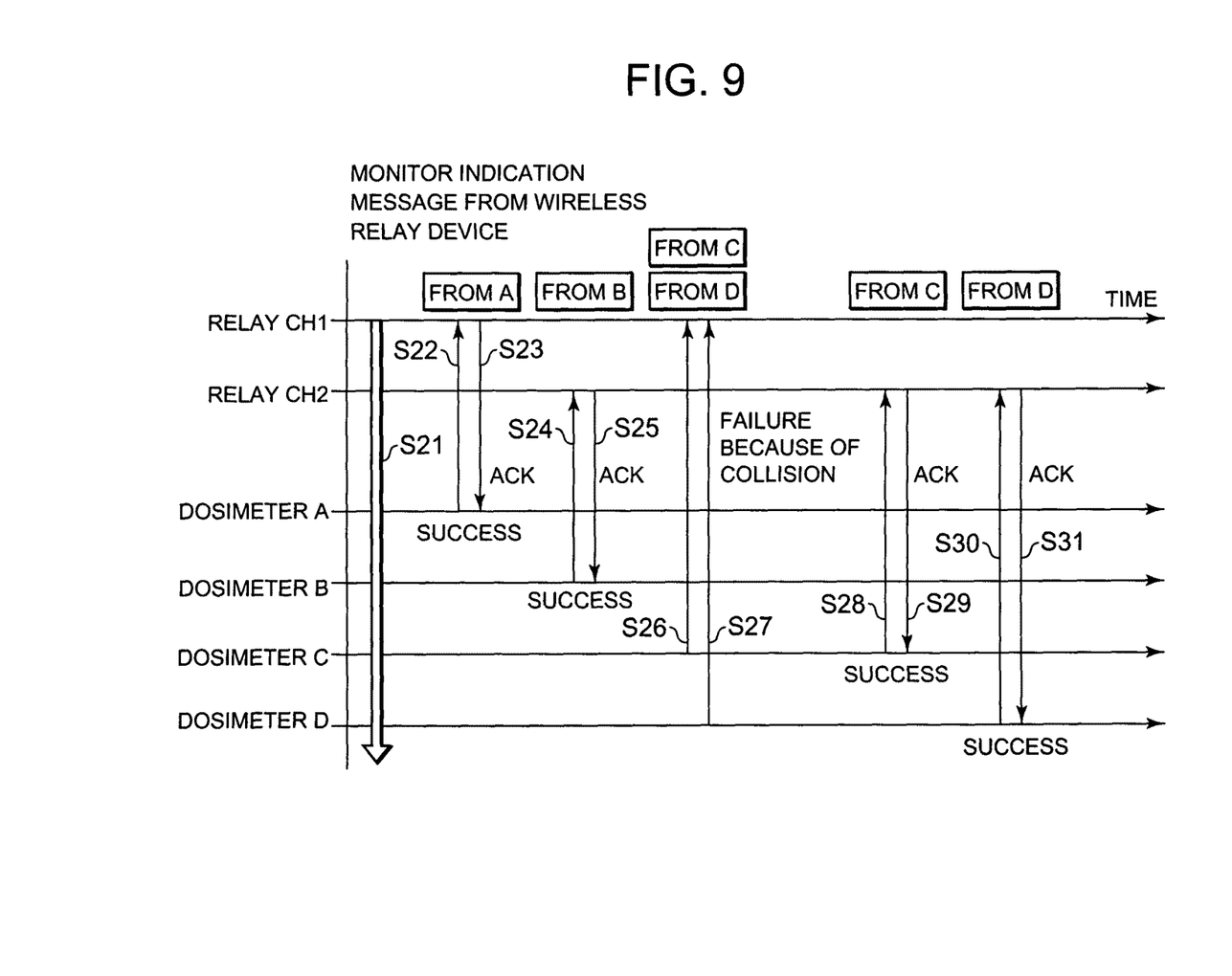
FIG. 9 is a sequence diagram illustrating an example of message exchange between four dosimeters and two wireless relay devices according to the embodiment.

FIG. 9 is a sequence diagram illustrating an example of message exchange between four dosimeters 1 and two wireless relay devices 2 according to the present embodiment. The identification symbols of the four dosimeters 1 are "A", "B", "C", and "D", and communication channels allocated to the two wireless relay devices 2 are "CH1" and "CH2".

First, the two wireless relay devices 2 transmit monitor indication messages at the same time by respective channels "CH1" and "CH2" (S21). Where the dosimeters 1 with the identification codes "A", "B", "C", and "D" receive the monitor indication messages, the dosimeters generate a response time the number of times designated by the monitor indication message and determine the response time for each of the channels "CH1" and "CH2".

The dosimeter 1 with the identification code "A" transmits a monitor response message by the communication channel "CH1" at the very first determined response time (S22). Where the wireless relay device 2 of "CH1" receives the monitor response message, the wireless relay device transmits an ACK to the dosimeter 1 with the identification code "A" (S23). As a result, the dosimeter 1 with the identification code "A" stops transmitting the monitor response message.

Then, the dosimeter 1 with the identification code "B" transmits a monitor response message by the communication channel "CH2" at the very first determined response time (S24). Where the wireless relay device 2 of "CH2" receives the monitor response message, the wireless relay device transmits an ACK to the dosimeter 1 with the identification code "B" (S25). As a result, the dosimeter 1 with the identification code stops transmitting the monitor response message.

Then, the dosimeter 1 with the identification code "C" transmits a monitor response message by the communication channel "CH1" at the very first determined response time (S26) and at the same time the dosimeter 1 with the identification code "D" transmits the monitor response message by the communication channel "CH1" at the very first determined response time (S27) and collision occurs. Therefore, since the wireless relay device 2 of "CH1" does not transmit an ACK, the dosimeter 1 with the identification code "C" transmits the monitor response message by the communication channel "CH2" at the next response time (S28). The wireless relay device 2 of "CH2" receives the monitor response message and transmits an ACK to the dosimeter 1 with the identification symbol "C" (S29). As a result, the dosimeter 1 with the identification code "C" stops the transmission of the monitor response message.

Further, the dosimeter 1 with the identification code "D" transmits the monitor response message by the communication channel "CH2" at the next response time (S30). The wireless relay device 2 of the "CH2" receives the monitor response message and transmits an ACK to the dosimeter 1 with the identification code "D" (S31). As a result, the dosimeter 1 with the identification code "D" stops the transmission of the monitor response message.

As described hereinabove, each dosimeter 1 transmits a monitor response message to each communication channel at a plurality of times. As a result, even if the collision of monitor response messages occurs, the monitor response message can be transmitted to another channel again at another time. Therefore, the wireless relay devices 2 and the monitoring device 5 can collect exposure dose data from a large number of dosimeters 1 quickly. Further, since the wireless relay device 2 transmits an ACK when a response from a dosimeter 1 has been normally received, the dosimeter 1 can stop transmitting subsequent monitor response messages. As a consequence, unnecessary communication is inhibited, occurrence of collisions can be prevented, and exposure dose data can be efficiently collected. Further, by disposing a plurality of wireless relay devices 2, it is possible to cover the entire work region and prevent a leak of the exposure dose data.

Further, the above-described embodiment is explained under an assumption that the dosimeters 1 and wireless relay devices 2 perform wireless communication by using a FDMA system, but this communication system is not limiting and wireless communication of any system with channel allocation may be used. For example, a CDMA (Code Division Multiple Access) system may be also used.

In the above-described embodiment, the correspondence relationship between each of a plurality of response times and communication channels is determined by the response time determination unit 132 at random by using random numbers, but this method for determining the correspondence relationship is not limiting. For example, the determination may be made on the basis of a rule of correspondence relationship defined in advance by a table or the like.

Further, in the above-described embodiment, the two wireless relay devices 2 transmit monitor indication messages simultaneously by respective communication channels "CH1" and "CH2", but when interference can occur, it is possible to set the wireless relay devices 2 such that, for example, one wireless relay device 2 of "CH1" transmits a monitor indication message, where the other wireless relay device 2 of "CH2" does not transmit a monitor indication message.

With the configurations according to the above-described embodiment, an exposure dose of workers working in a radiation management area located in a nuclear power plant or a nuclear fuel processing facility can be monitored and managed quickly by collecting exposure dose data from a large number of dosimeters quickly.

Embodiments of the invention have been described, but the invention is not limited to the embodiments described, and various modifications, alterations, and combinations are possible based on the technical concepts of the invention.

The invention claimed is:

1. An exposure management system comprising:
a plurality of dosimeters, which are carried by workers for measuring exposure doses in a radiation management facility, each dosimeter comprising:
means for receiving a monitor indication message transmitted by a relay device, the monitor indication message requesting said each dosimeter to provide a response to the monitor indication message, said response including an amount of a measured exposure dose,
means for generating a designated number of response times based at least on a number of response time slots indicated in the monitor indication message transmitted by the relay device, a response time of the designated number of response times corresponding to a time at which a response is to be transmitted, for providing said response and determining a communication channel, selected from a group of communication channels, corresponding to each of the generated response times, the generated response times being later than a time that reception of the monitor indication message ends, and
means for transmitting said response at each of the generated response times by using the determined communication channel corresponding to said each of the generated response times;
a plurality of wireless relay devices that wirelessly communicate with the dosimeters and are allocated with respective communication channels that are different from each other, the allocated communication channels being selected from among the communication channels of said group on a one-to-one basis, the wireless relay devices being configured to transmit the monitor indication message to the allocated communication channels and receive from the dosimeters respective responses to the monitor indication message; and
a monitoring device connected to the wireless relay devices, for monitoring an exposure state of each of the workers through the wireless relay devices and dosimeters.

2. The exposure management system according to claim 1, wherein each wireless relay device comprises means for designating a number of response times to be generated by the dosimeters by including information designating the number of response times in the monitor indication message.

3. The exposure management system of claim 2, wherein each wireless relay device is configured to collect exposure dose data in a period in which a monitor collection operation from transmission of the monitor indication message to reception of a response to the monitor indication message is repeated a plurality of times, wherein a number of times that the monitor collection operation is repeated corresponds to a number of response time slots.

4. The exposure management system according to claim 1, wherein
each wireless relay device comprises means for transmitting to one of the dosimeters an acknowledgment signal, upon reception of one of the responses from said one of the dosimeters, for providing notification of normal reception of said one of the responses, and
said each dosimeter further comprises means for stopping subsequent transmissions of said response when an acknowledgment signal is received from a wireless relay device.

5. The exposure management system according to claim 1, wherein said each dosimeter further comprises means for retransmitting said response, when a collision occurs between said response and another response that have been transmitted at a same time by using a same communication channel.

6. The exposure management system according to claim 1, wherein the wireless relay devices and the monitor device communicate by radio wave.

7. The exposure management system according to claim 1, wherein the wireless relay devices and the monitor device communicate by cable.

8. The exposure management system according to claim 1, wherein
the monitoring device comprises means for providing to a dosimeter information of abnormality of the dosimeter; and
said each dosimeter further comprises means for providing notification of an abnormality when abnormality information is provided from the monitoring device to said each dosimeter.

9. The exposure management system according to claim 8, wherein the notification provided by the abnormality notification means is an audio or visual notification.

10. A dosimeter, which is carried by a worker for measuring an exposure dose in a radiation management facility and wirelessly communicates with a plurality of wireless relay devices by using respective communication channels allocated to the wireless relay devices, the allocated communication channels being selected from among a group of communication channels on a one-to-one basis, comprising:
means for receiving a monitor indication message transmitted by a relay device, the monitor indication message requesting the dosimeter to provide a response to a monitor indication message, said response including information of an amount of a measured exposure dose;
means for generating a designated number of response times for providing said response, the designated number of response times based at least on a number of response time slots indicated in the monitor indication message transmitted by the relay device, a response time of the designated number of response times corresponding to a time at which a response is to be transmitted, and determining a communication channel, selected from said group of communication channels, corresponding to each of the generated response times, the generated response times being later than a time that the reception of the monitor indication message ends; and
means for transmitting said response at each of the generated response times by using the determined communication channel corresponding to said each of the generated response times.

11. The dosimeter according to claim 10, further comprising means for stopping subsequent transmissions of said response to the monitor indication message when an acknowledgment signal is received from a wireless relay device.

12. The dosimeter according to claim 10, further comprising means for retransmitting said response when a collision occurs between said response and another response that have been transmitted at a same time by using a same communication channel.

* * * * *